United States Patent [19]

Thomas

[11] Patent Number: 4,609,535

[45] Date of Patent: Sep. 2, 1986

[54] EXTRACTING SOLUBLE PHOSPHATES FROM NATURALLY OCCURRING IRON AND ALUMINIUM PHOSPHATES USING SOLUTIONS OF ALKALI METAL CARBONATES AND HYDROXIDES

[76] Inventor: Griffith Thomas, 81 Lynbara Ave., St. Ives, New South Wales, Australia, 2075

[21] Appl. No.: 636,601

[22] Filed: Aug. 1, 1984

[30] Foreign Application Priority Data

Aug. 4, 1983 [AU] Australia ............................. PG0662

[51] Int. Cl.$^4$ ............................................. C01B 25/16
[52] U.S. Cl. .................................... 423/167; 423/131; 423/150; 423/312
[58] Field of Search ................. 423/167, 312, 150, 131

[56] References Cited

U.S. PATENT DOCUMENTS

| | | | |
|---|---|---|---|
| 1,252,318 | 1/1918 | Blumenberg | 423/167 |
| 1,799,882 | 4/1931 | Brenek | 71/47 |
| 1,935,474 | 11/1933 | Laubi | 423/150 |
| 1,961,127 | 6/1934 | Coleman | 423/312 |
| 2,220,790 | 11/1940 | McCullough | 423/312 |
| 2,221,356 | 11/1940 | Michels | 423/312 |
| 2,430,863 | 11/1947 | Colton et al. | 423/312 |
| 4,113,184 | 9/1978 | Loughrie | 423/167 |
| 4,167,406 | 9/1979 | Hauschild et al. | 423/167 |
| 4,321,244 | 3/1982 | Magnier et al. | 423/150 |
| 4,374,817 | 2/1983 | Lehman et al. | 423/167 |

FOREIGN PATENT DOCUMENTS

| | | | |
|---|---|---|---|
| 606795 | 10/1960 | Canada | 423/312 |
| 804292 | 11/1958 | United Kingdom . | |
| 345938 | 2/1979 | U.S.S.R. | 423/167 |

*Primary Examiner*—John Doll
*Assistant Examiner*—Wayne A. Langel
*Attorney, Agent, or Firm*—Cushman, Darby & Cushman

[57] ABSTRACT

A process for production of alkali metal phosphates from material containing iron and aluminium phosphates comprises leaching the said material with alkali metal carbonate solution to produce a leachate containing dissolved phosphates, and recovering alkali metal phosphates from the leachate. In a preferred embodiment, the carbonate leach is followed by further leaching wth alkali metal hydroxide to effect further dissolution of phosphates from the material, before recovering alkali metal phosphates from the leachate.

8 Claims, No Drawings

EXTRACTING SOLUBLE PHOSPHATES FROM NATURALLY OCCURRING IRON AND ALUMINIUM PHOSPHATES USING SOLUTIONS OF ALKALI METAL CARBONATES AND HYDROXIDES

This invention relates to the extraction of soluble phosphates from naturally occurring iron and aluminium phosphates.

Previous art involves dissolving complex iron and aluminium phosphates in sodium hydroxide, as will be discussed in more detail below.

The present invention is characterised by the use of alkali metal carbonate solutions to leach naturally occurring phosphates. In a preferred embodiment of the invention the carbonate leach is followed by further leaching with alkali metal hydroxide. The process of the invention may be applied to many types of naturally occurring phosphates, including those from Christmas Island, Senegal, Brazil and other sources.

The carbonate leach is preferably carried out at elevated temperature, for example from 70° C. and the boiling point at atmospheric pressure, or under imposed pressure from 100° to 150° C.

In one form of the invention, barrandite, a naturally occurring iron and aluminium phosphate, is leached under pressure at 100°–150° C. with potassium carbonate solution to form a solution of potassium orthophosphate and potassium aluminate. The residual solids are leached further with potassium hydroxide solution at 70°–90° C. to give essentially complete extraction of phosphorus and aluminium in the original barrandite. Residual solids are separated from the solutions and the solutions cooled to separate out potassium orthophosphates. The remaining solution is cooled to precipitate aluminium trihydrate and the resulting potassium carbonate recycled to leach more barrandite.

In a simplified form the reactions taking place are believed to be:

$$2FePO_4 + 3K_2CO_3 + 3H_2O \rightarrow 2Fe(OH)_3 + 2K_3PO_4 + 3CO_2 \quad 1.$$

$$2AlPO_4 + 4K_2CO_3 \rightarrow 2KAlO_2 + 2K_3PO_4 + 4CO_2 \quad 2.$$

$$FePO_4 + 3KOH \rightarrow Fe(OH)_3 + K_3PO_4 \quad 3.$$

$$AlPO_4 + 4KOH \rightarrow KAlO_2 + K_3PO_4 + 2H_2O \quad 4.$$

$$2KAlO_2 + 3H_2O + CO_2 \rightarrow K_2CO_3 + 2Al(OH)_3 \quad 5.$$

In another form of the invention Christmas Island G grade rock, a naturally occurring complex calcium iron aluminium phosphate is leached with hot sodium carbonate solution to form a solution of sodium orthophosphates and sodium aluminate. The residual solids are leached with hot sodium hydroxide solution to bring essentially all the phosphorus and aluminium associated with the iron and aluminium in the original rock into solution. Residual solids essentially calcium phosphate and iron hydroxide are separated from the solution which is then cooled to crystallize out sodium orthophosphates. The remaining solution is carbonated to precipitate aluminium hydroxide and the resulting sodium carbonate solution recycled to leach more Christmas Island C grade rock.

In a simplified form the reactions taking place are believed to be:

$$2FePO_4 + 3Na_2CO_3 + 3H_2O \rightarrow 2Fe(OH)_3 + 2Na_3PO_4 + 3CO_2$$

$$2AlPO_4 + 4Na_2CO_3 \rightarrow 2NaAlO_2 + Na_3PO_4 + 4CO_2$$

$$FePO_4 + 3NaOH \rightarrow Fe(OH)_3 + 2Na_3PO_4$$

$$AlPO_4 + 4NaOH \rightarrow NaAlO_2 + Na_3PO_4 + 2H_2O$$

$$2NaAlO_2 + CO_2 + 3H_2O \rightarrow Na_2CO_3 + 2Al(OH)_3$$

In a third form of the invention, a calcium phosphate rock contaminated with minor amounts of iron and aluminium phosphates which make it undesirable for conventional fertilizer manufacture, is treated to reduce the iron and aluminium content. Low-grade Florida rock is a rock of this type. After leaching with hot sodium carbonate solution, the resulting sodium carbonate and phosphate solution is separated from the unreacted rock and iron hydroxide. The insoluble material is classified to remove as much colloidal iron hydroxide as possible and it is then suitable for conventional fertilizer manufacture.

The solution of sodium phosphate and sodium aluminate is cooled to crystallize out sodium orthophosphates and the remaining solution carbonated to produce sodium carbonate and aluminium hydroxide. The sodium carbonate is recycled to leach more low grade Florida rock.

In a simplified form the reactions taking place are believed to be represented by the equations outlined for the second form of the invention.

In the above description of the invention it should be clearly understood that where potassium compounds are mentioned sodium compounds are also applicable and vice versa.

ADVANTAGES

Previous art involves dissolving complex iron and aluminium phosphates in sodium hydroxide. The resulting solution is freed from residual solids, cooled to crystallize out sodium phosphate, and the resulting sodium aluminate solution decomposed into aluminium hydroxide and sodium hydroxide, see Rothbaum and Reeve, "Recovery of Alumina and Phosphate from Christmas Island C Phosphate" N. Z. Journal of Science Vol. II No. 4, December, 1968.

This technique has the apparent advantage that the sodium associated with aluminium in solution can be recovered as sodium hydroxide. However the decomposition of sodium aluminate, the Bayer process, requires large decomposition vessels, the recirculation of large volumes of seed aluminium hydroxide and the use of relatively dilute solutions to promote the decomposition of sodium aluminate. The recovered sodium hydroxide solution from Bayer decomposition $$NaAlO_2 + 2H_2O \rightleftharpoons NaOH + Al(OH)_3$$

has to be evaporated for reuse. It will be observed from equation 2 that only 25% of the sodium hydroxide reacting with aluminium phosphate is recovered by the Bayer process and none from iron phosphates (equation 3).

My process has the advantage that capital and operating cost of the large decomposers, evaporators and seed recycle equipment is eliminated. The relatively small amount of alkali metal carbonate produced in decomposing the alkali metal aluminate is recycled to dissolve more phosphate rock by reactions 1 and 2.

My process has the additional advantage that potassium carbonates and hydroxide can be used to produce valuable potassium phosphate. If potassium hydroxide is used to dissolve iron and aluminium phosphates the resulting potassium aluminate is not suitable for recovery of potassium hydroxide by a process analagous to the Bayer process with sodium aluminate, but potassium aluminate can be readily decomposed by carbon dioxide.

The invention will be further illustrated by the following non-limiting examples.

EXAMPLE 1

One hundred grams of Barrandite from Christmas Island was ground in hot sodium carbonate solution recycled from previous experiments and leached in agitated vessels for one hour at 70° C. This dissolved about 13% of phosphate present in the original rock.

The ground barrandite slurry was further reacted with sodium hydroxide in agitated vessels.

This sodium hydroxide was added as a 50% solution and the barrandite suspension agitated for 30 minutes at 80° C. The amount of sodium hydroxide added was calculated to be stoichiometrically equivalent to the "caustic available" phosphate present in the original barrandite. "Caustic available" phosphate is defined as total phosphorous less 0.5 times the calcium present e.g. roughly equivalent to calcium phosphate.

Residual solids, consisting largely of insoluble iron compounds and calcium phosphate, were filtered from the leach solution at 70° C. This clarified solution was then cooled to 20° C. when practically all the phosphate present crystallized as sodium orthophosphates.

The sodium orthophosphates were filtered off and the residual sodium aluminate solution reheated to 35° C. and a small amount of aluminium hydroxide added to promote subsequent precipitation. Carbon dioxide was bubbled into the solution to suspend the aluminium hydroxide and decompose the sodium aluminate to sodium carbonate and aluminium hydroxide. After three hours carbonation the aluminium hydroxide was filtered off at 35° C. and the resulting sodium carbonate solution cooled to 20° C. to crystallize out and recover sodium carbonate. The residual solution containing sodium carbonate and a small amount of sodium phosphate was recycled for leaching more barrandite.

By this technique I was able to recover over 90% of the soluble phosphate in barrandite. Of the sodium reacting to form sodium aluminate, approximately 20% of the sodium hydroxide used, over 90% of it was recovered in the form of sodium carbonate.

EXAMPLE 2

In this experiment the same technique was used as in Example 1 except that after grinding and leaching in recycled sodium carbonate, the ground barrandite slurry was heated to boiling point to drive off some of the carbon dioxide present as sodium bicarbonate. By this means the amount of sodium hydroxide used for subsequent leaching was reduced to 90% of stoichiometric.

EXAMPLE 3

In this experiment potassium carbonate and potassium hydroxide were used instead of the sodium compounds in Example 2. Because of the greater causticity of the potassium salts approximately 20% of the caustic available phosphate was solubilised during grinding and the amount of potassium hydroxide used for subsequent leach was reduced to 85% of stoichiometric. The overall effect was that no byproduct potassium carbonate was produced and the solution after aluminium hydroxide precipitation could be recycled direct to grinding.

It will be clearly understood that the invention in its general aspects is not limited to the specific details referred to hereinabove.

The claims defining the invention are as follows; I claim:

1. A process for production of alkali metal phosphates from naturally occurring phosphate rock which has not been chemically treated to extract phosphates, the phosphate content of the rock being predominantly iron phosphates and aluminum phosphates, the process comprising leaching the phosphate rock with alkali metal carbonate solution to produce a leachate containing dissolved alkali metal phosphates, separating the leachate from undissolved residual solids and recovering the alkali metal phosphates from the leachate.

2. A process as in claim 1 including leaching said residual solids with alkali metal hydroxide to effect further dissolution of phosphates, and recovering alkali metal phosphates from the hydroxide leachate.

3. A process according to claim 1 in which the leaching with alkali metal carbonate solution is carried out at elevated temperature.

4. A process according to claim 3 in which the leaching with alkali metal carbonate solution is carried out under pressure at 100° to 150° C.

5. A process for production of alkali metal phosphates from naturally occurring phosphate rock containing predominantly iron phosphates and aluminum phosphates which comprises leaching the rock with alkali metal carbonate solution at 70°–100° C. to effect dissolution of phosphate from the rock, separating the leachate from undissolved residual solids, adding alkali metal hydroxide solution to the residual solids and continuing the treatment to effect further dissolution of phosphates from the rock, removing residual solids from the leachate, and cooling the leachate to precipitate phosphates therefrom.

6. A process according to claim 5, in which the solution from which the phosphates have been precipitated is carbonated with carbon dioxide to precipitate aluminum hydroxide therefrom, and the precipitated aluminum hydroxide is removed to produce a solution of alkali metal carbonate which may be recycled to the initial leaching step.

7. A process according to claim 5 in which the alkali metal carbonate is sodium carbonate.

8. A process according to claim 5 in which the alkali metal carbonate is potassium carbonate.

* * * * *